(12) United States Patent
Yu et al.

(10) Patent No.: US 10,518,801 B2
(45) Date of Patent: Dec. 31, 2019

(54) ESTIMATING STABILITY MARGINS IN A STEER-BY-WIRE SYSTEM

(71) Applicant: GM Global Technology Operations LLC, Detroit, MI (US)

(72) Inventors: Bo Yu, Novi, MI (US); Ibrahim A. Badiru, Novi, MI (US); Scott R. Kloess, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 15/787,883

(22) Filed: Oct. 19, 2017

(65) Prior Publication Data

US 2019/0118855 A1 Apr. 25, 2019

(51) Int. Cl.
| | |
|---|---|
| *G01M 17/00* | (2006.01) |
| *B62D 5/04* | (2006.01) |
| *G05B 15/02* | (2006.01) |
| *B62D 5/00* | (2006.01) |

(52) U.S. Cl.
CPC ........... *B62D 5/0481* (2013.01); *B62D 5/001* (2013.01); *B62D 5/0472* (2013.01); *G05B 15/02* (2013.01); *B62D 5/0457* (2013.01)

(58) Field of Classification Search
CPC .... B62D 5/0481; B62D 5/001; B62D 5/0472; B62D 5/0457; G05B 15/02
USPC ........................................................ 701/32.8
See application file for complete search history.

(56) References Cited

U.S. PATENT DOCUMENTS

| | | | |
|---|---|---|---|
| 2003/0055546 A1* | 3/2003 | Demerly ................ | B62D 5/001 701/42 |
| 2008/0164087 A1* | 7/2008 | Koyama ................ | B62D 6/008 180/402 |
| 2009/0024908 A1* | 1/2009 | Kottke ................ | G06F 11/0739 714/799 |
| 2014/0019006 A1* | 1/2014 | Bruce .................. | B62D 5/0457 701/41 |
| 2016/0107682 A1* | 4/2016 | Tan ......................... | B62D 6/00 701/41 |
| 2017/0217484 A1* | 8/2017 | Toda ........................ | B62D 6/00 |
| 2017/0267221 A1* | 9/2017 | Hecker .................... | B60T 7/085 |
| 2018/0086371 A1* | 3/2018 | Wang .................... | B62D 5/0457 |

* cited by examiner

Primary Examiner — Shardul D Patel
(74) Attorney, Agent, or Firm — Cantor Colburn LLP

(57) ABSTRACT

Examples of techniques for estimating stability margins in a steer-by-wire system are disclosed. In one example implementation, a method for open-loop steer-by-wire (SbW) system linearization includes linearizing, by a processing device, an open-loop SbW system at different operating points. The method further includes determining, by the processing device, an open-loop transfer function of the open-loop SbW system. The method further includes estimating, by the processing device, margins of stability for the open-loop SbW system. The method further includes implementing the margins of stability into a vehicle to reduce instability in a steering system of the vehicle.

19 Claims, 10 Drawing Sheets

ESTIMATING STABILITY MARGINS IN A STEER-BY-WIRE SYSTEM

INTRODUCTION

The present disclosure relates generally to steer-by-wire systems and more particularly to estimating stability margins in steer-by-wire systems.

A vehicle, such as a car, a motorcycle, or any other type of automobile may be equipped with a steer-by-wire (SbW) system. Also referred to as drive-by-wire systems, SbW systems use electrical and/or electro-mechanical systems to control the vehicle (e.g., steering) instead of traditional mechanical linkages. For example, a steer-by-wire system can use electromechanical actuators and human-machine interfaces (e.g., a steering feel emulator, etc.) to control the vehicle. Accordingly, mechanical components such as the steering intermediate shaft and other associated components are not needed to control the vehicle.

SUMMARY

In one exemplary embodiment, a computer-implemented method for open-loop steer-by-wire (SbW) system linearization is provided. The method includes linearizing, by a processing device, an open-loop SbW system at different operating points. The method further includes determining, by the processing device, an open-loop transfer function of the open-loop SbW system. The method further includes estimating, by the processing device, margins of stability for the open-loop SbW system. The method further includes implementing the margins of stability into a vehicle to reduce instability in a steering system of the vehicle.

In some examples, estimating margins of stability further comprises calculating a stability margin at each of the different operating points. In some examples, estimating margins of stability further comprises calculating a gain margin at each of the different operating points. In some examples, estimating margins of stability further comprises calculating a phase margin at each of the different operating points. In some examples, estimating margins of stability further comprises calculating a time delay margin at each of the different operating points. In some examples, linearizing the open-loop SbW system further includes defining, by the processing device, the different operating points. In some examples, linearizing the open-loop SbW system further includes deriving, by the processing device, linear differential equations of mechanical systems, electrical systems, and control algorithms in the vehicle at the different operating points. In some examples, linearizing the open-loop SbW system further includes deriving, by the processing device, a differential equation that takes as input a steering wheel angle command and outputs a steering wheel angle measurement. In some examples, determining the open-loop transfer function further include converting, by the processing device, the differential equation from a time domain to a Laplace domain to obtain the open-loop transfer function.

In another exemplary embodiment, a computer-implemented method for open-loop steer-by-wire (SbW) system identification is provided. The method includes collecting, by a processing device, input data and output data from an open-loop SbW system. The method further includes determining, by the processing device, an open-loop transfer function based at least in part on the collected input data and the collected output data. The method further includes estimating, by the processing device, margins of stability for the open-loop SbW system using the open-loop transfer function. The method further includes implementing the margins of stability into a vehicle to reduce instability in a steering system of the vehicle.

In some examples, estimating margins of stability further comprises calculating a stability margin. In some examples, estimating margins of stability further comprises calculating a gain margin. In some examples, estimating margins of stability further comprises calculating a phase margin. In some examples, estimating margins of stability further comprises calculating a time delay margin. In some examples, the margins of stability are determined from Bode plots of the collected input data and the collected output data. In some examples, the input data is a steering wheel angle command from an emulator, and wherein the output data is a steering wheel angle measurement.

In yet another exemplary embodiment, a computer-implemented method for closed-loop steer-by-wire (SbW) system identification is provided. The method includes adding, by a processing device, a disturbance signal to a closed-loop SbW system. The method further includes determining, by the processing device, a closed-loop transfer function based on the disturbance input and a steering wheel torque command. The method further includes estimating, by the processing device, margins of stability for the closed-loop SbW system using the closed-loop transfer function. The method further includes implementing the margins of stability into a vehicle to reduce instability in a steering system of the vehicle.

In some examples, the disturbance signal is disturbance torque. In some examples, the disturbance torque is bandlimited white noise signals. In some examples, the disturbance torque is a sum of sines with different frequencies. In some examples, estimating margins of stability further comprises calculating at least one of a stability margin, a gain margin, a phase margin, and a time delay margin.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
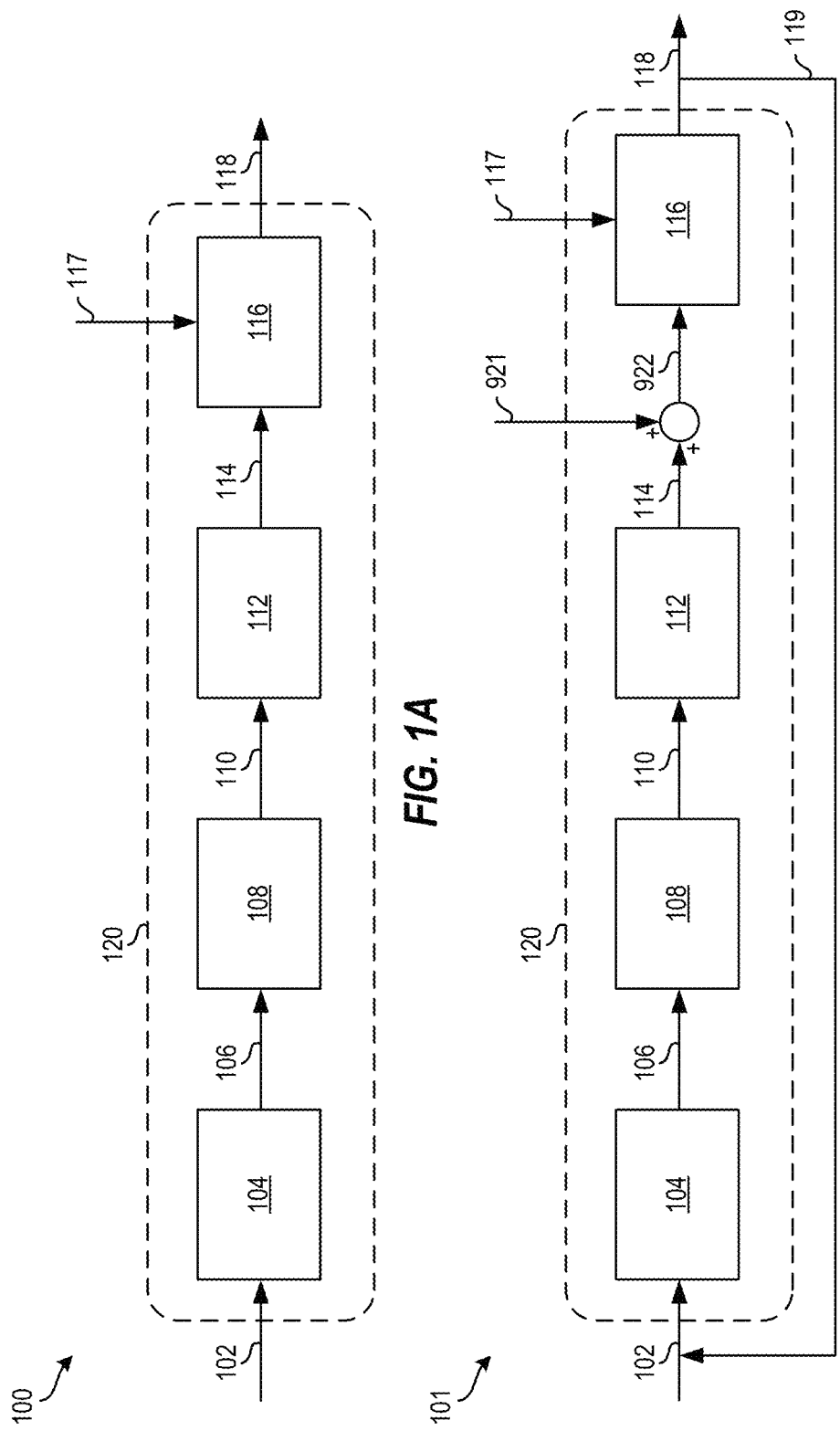
FIG. 1A depicts a block diagram of an open-loop SbW system, according to aspects of the present disclosure.
FIG. 1B depicts a block diagram of a closed-loop SbW system, according to aspects of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for assessing stability margins of steer-by-wire (SbW) systems. SbW systems can be susceptible to unintended vibrations induced by resonant frequencies in the electromechanical components of the SbW system or electronic control system, the design of the control and communication systems, and the change of electromechanical properties during a life cycle of a vehicle. This can be caused by reduced system-level damping. Instability of steering systems can cause excessive vibration and pose a potential hazard for an operator and/or occupant(s) of the vehicle. Another cause for unintended vibrations can be reduced system-level mechanical damping compared with electrical and hydraulic power steering systems.

The technical solutions described herein enable stability to be evaluated (physically and analytically) to enable a SbW system to be designed to reduce and/or prevent instability in the steering system as well as assess the performance of an existing physical system. In particular, margins of stability of SbW systems are defined and assessed using one or more of the following techniques: open-loop system linearization, open-loop system identification, and closed-loop system identification. Using one or more of these techniques, margins of stability can be estimated at different operating points (e.g., different vehicle speed and steering wheel angle combinations). Each operating point generates margins of stability, and problematic margins of stability can be identified.

The technical solutions described herein provide a number of benefits. For example, the ability to determine stability margins of SbW systems and to reduce unwanted system vibrations is provided. For example, quantitative stability margins with vibration and noise issues can be correlated during laboratory and in-vehicle tests. Stability issues can be identified and improved at early stages of vehicle development. Instability issues and customer complaints can be reduced. Moreover, more accurate stability margins can be produced to design less hazardous and more robust vehicles.

FIG. 1A depicts a block diagram of an open-loop SbW system 100, according to aspects of the present disclosure. FIG. 1B depicts a block diagram of a closed-loop SbW system 101, according to aspects of the present disclosure. In both the open-loop SbW system 100 and the closed-loop SbW system 101, the dashed box represents an open-loop transfer function 120, which can be denoted L(s).

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

In examples, the module(s), component(s), controller(s), engine(s), etc. described herein can be a combination of hardware and programming. The programming can be processor executable instructions stored on a tangible memory, and the hardware can include the processing device (e.g., the processor 1021 of FIG. 10) for executing those instructions. Thus a system memory (e.g., random access memory 1024 of FIG. 10) can store program instructions that when executed by the processing device implement the engines described herein. Other engines, components, modules, controllers, etc. can also be utilized to include other features and functionality described in other examples herein.

The open-loop SbW system 100 receives a steering wheel angle command 102, such as from an emulator that measures steering wheel angle commands. The command 102 is fed into a converter 104 to convert the steering wheel angle to a rack position command 106 that corresponds to the steering wheel angle. The converter 104 can also introduce a time delay in some examples.

The command 106 is fed into a road wheel actuator controller 108 to implement the command 106 by causing the road wheels or the rack of the vehicle to move to a position that corresponds to the command 102. The road wheel actuator controller 108 can also include motor-to-tire (i.e., road wheel) mechanical systems and vehicle dynamics. The road wheel actuator controller 108 provides an output 110 of signals measured as the road wheel actuator controller 108 implements the command 106. For example, the output 110 can include an estimated or measured rack force on the rack, a motor velocity, and/or other signals.

The output 110 is fed into a torque calculator 112 to calculate a steering wheel torque based on the output 110 to generate a steering wheel torque command 114. According to aspects of the present disclosure, the torque calculator 112 can also introduce a time delay. The command 114 is fed into a steering emulator controller 116 to emulate the command 114. The steering emulator controller 116 may contain the motor, worm gear, steering column, tire force, and steering wheel mechanical systems. Driver torque 117 can also be fed into the steering emulator controller 116. The steering emulator controller 116 generates a steering wheel angle measurement 118 based on the command 114 and/or the driver torque 117. In some examples, the steering wheel angle measurement 118 is negated (e.g., multiplied by −1).

Turning now to FIG. 1B, the closed-loop SbW system 101 can include the components, commands, etc., of the open-loop SbW system 100 of FIG. 1A. However, the closed-loop SbW system 100 further includes a feedback loop 119 from the output of the steering emulator controller 116 (e.g., the steering wheel angle measurement 118) back to the input of the converter 104 (e.g., the steering wheel angle command 102). In this way, the open-loop SbW system 100 becomes a closed-loop SbW system.

The open-loop SbW system 100 and the closed-loop SbW system 101 can be used individually to determine stability margins of SbW systems. The margins of stability describe how stable the SbW system is and how robust the SbW system is to perturbations and uncertainties. The margins of stability can be determined based at least in part on one or more of a stability margin ($s_m$), a gain margin ($g_m$), a phase margin ($\varphi_m$), and a delay margin ($\tau_m$).

Figure 2:
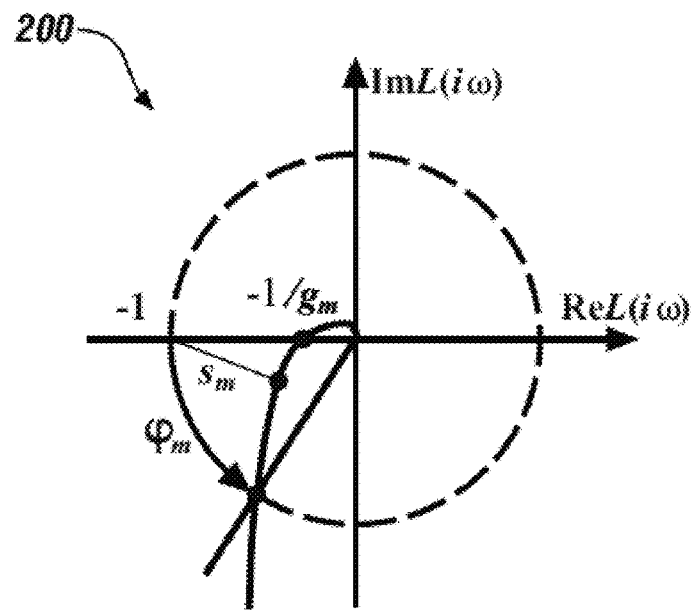
FIG. 2 depicts a Nyquist plot of a stability margin ($s_m$), according to aspects of the present disclosure.
Figure 3:
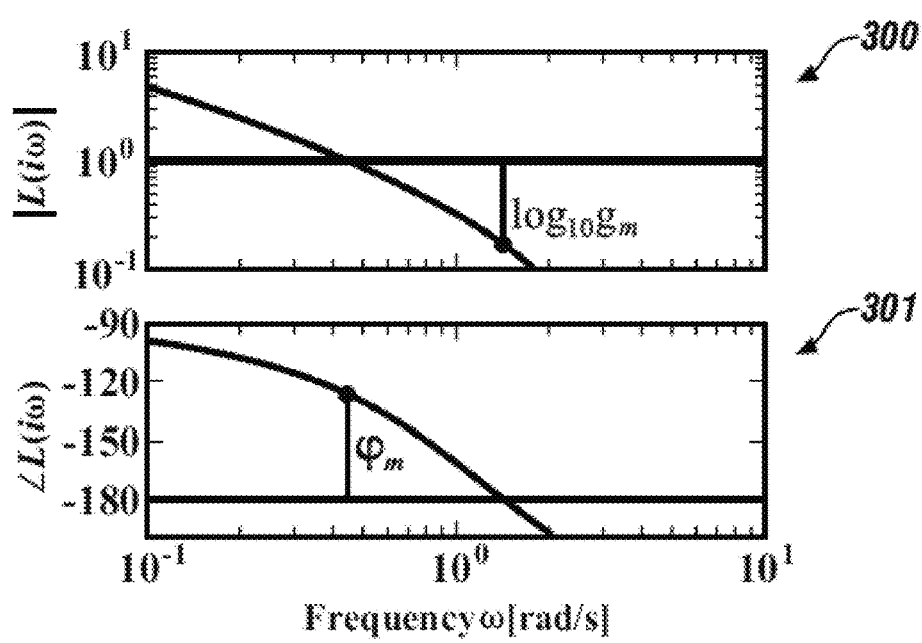
FIG. 3 depicts Bode plots of a gain margin ($g_m$) and a phase margin ($\varphi_m$) respectively, according to aspects of the present disclosure.

FIG. 2 depicts a Nyquist plot 200 of the stability margin ($s_m$), according to aspects of the present disclosure. The stability margin ($s_m$) is the shortest distance to a critical point −1 on the Nyquist plot. FIG. 3 depicts Bode plots 300, 301 of the gain margin ($g_m$) and the phase margin ($\varphi_m$) respectively, according to aspects of the present disclosure. The gain margin ($g_m$), depicted in Bode plot 300, is the smallest gain increase to create an encirclement around −1 on the Nyquist plot 200 (e.g., the inverse of the gain at the frequency where the phase is −180 degrees on the Bode plot 300). The phase margin ($\omega_m$), depicted in Bode plot 301, is the smallest change in phase to create an encirclement around −1 on the Nyquist plot 200 (e.g., 180 degrees plus the phase at the frequency where the gain is 1). The delay margin ($\tau_m$) is the smallest time delay increase to make the closed loop system (e.g., the closed-loop SbW system 101) unstable.

Figure 4:
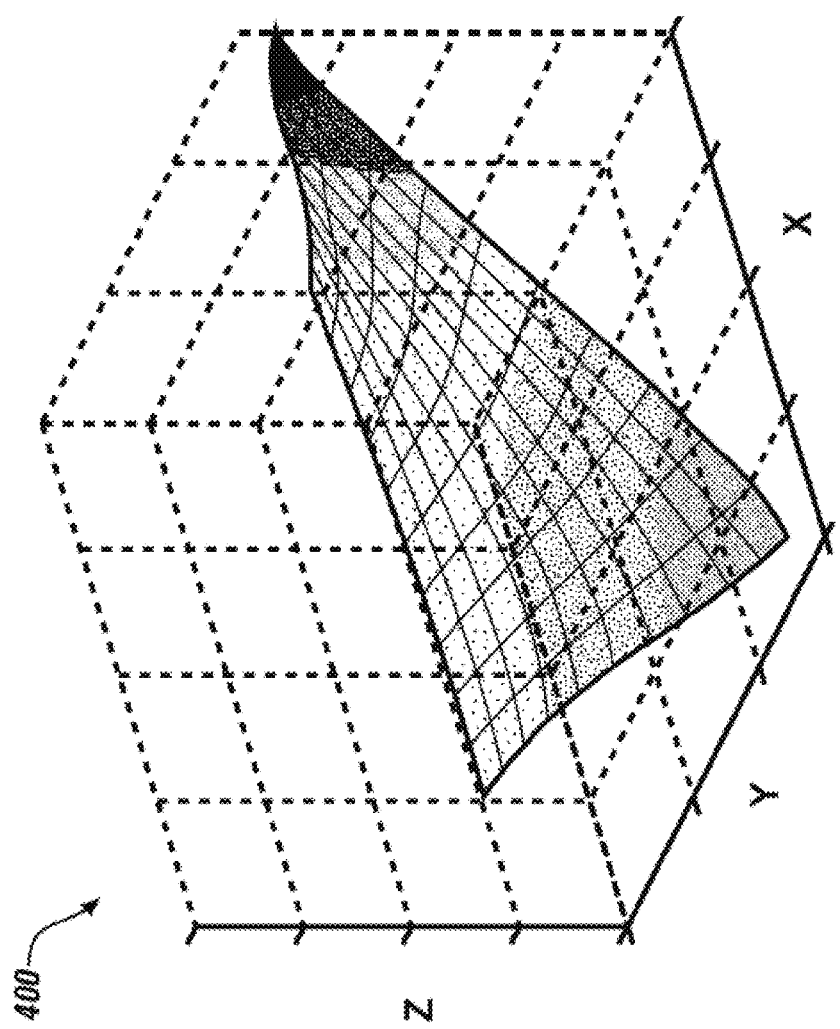
FIG. 4 depicts a plot of margins of stability for different operating conditions, according to aspects of the present disclosure.

The stability margin ($s_m$), the gain margin ($g_m$), the phase margin ($\varphi_m$), and/or the delay margin ($\tau_m$) can be obtained by performing open-loop system linearization, open-loop system identification, and/or closed-loop system identification to estimate margins of stability at different operating conditions. Each operating condition generates margins of stability, and the margins of stability for each of the operating conditions can be plotted. For example, FIG. 4 depicts a plot 400 of margins of stability for different operating conditions, according to aspects of the present disclosure. In the plot 400, the x-axis represents vehicle speed, the y-axis represents steering wheel angle, and the z-axis represents margins of stability. As shown, as the vehicle speed (x-axis) increases, the margins of stability (z-axis) also increase. Similarly, as the steering wheel angle (y-axis) increases, the margins of stability (z-axis) also increase. Using these margins of stability for different operating conditions, a SbW system can be designed to reduce and/or prevent instability in a steering system of a vehicle.

Figure 5:
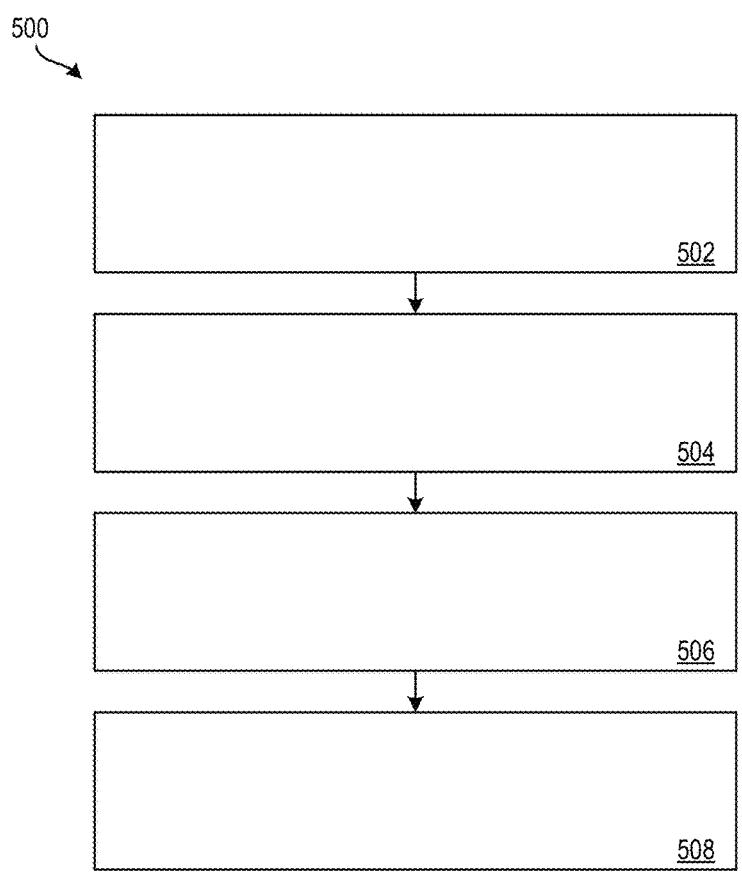
FIG. 5 depicts a flow diagram of a method for open-loop SbW system linearization, according to aspects of the present disclosure.

An example of a method for open-loop system linearization is now described with reference to the open-loop SbW system 100 of FIG. 1A. For example, FIG. 5 depicts a flow diagram of a method 500 for open-loop SbW system linearization, according to aspects of the present disclosure. The method 500 uses the open-loop SbW system 100 of FIG. 1 to estimate margins of stability. The method 500 can be implemented, for example, by the processing system 1000 of FIG. 10 or by another suitable processing system or device.

At block 502, a processing device (e.g., the processor 1021 of FIG. 10) linearizes the open-loop SbW system 100 at different operating points. Different operating points can include different combinations of vehicle speed and steering wheel angle. Linearizing the open-loop SbW system 100 includes performing a linear approximation of the non-linear open-loop SbW system 100 in a small region around an operating point. This can include, for example, taking a derivative at the operating point.

Operating points can be defined to cover possible operating conditions. For example, vehicle speed can be defined as 0 kilometers per hour (kph) to 150 kph at 10 kph intervals, and steering angle can be defined as −540 degrees to +540 degrees at 5-degree intervals. It should be appreciated that other operating conditions are also possible and can be defined differently in other examples.

Linear differential equations can then be derived for each of the pertinent systems in the vehicle, such as mechanical systems (e.g., rack gear, tires, etc.), electrical systems (e.g., motor controls, etc.), and control algorithms at each operating condition. Values of mechanical and electrical parameters (e.g., spring constant, damping, inertia, motor back electrical magnetic field constant, inductance, etc.) can be obtained from component specifications, from component-level measurements, or from other suitable sources.

Figure 6B:
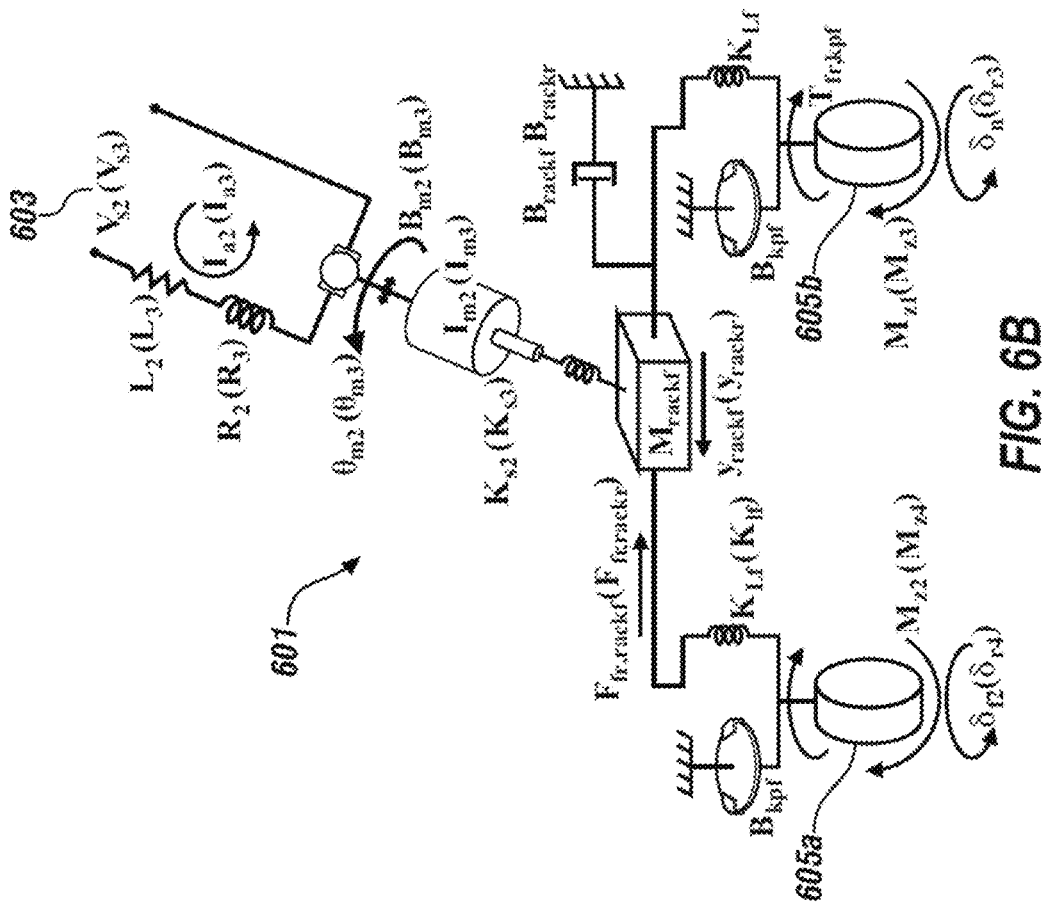
FIG. 6B depicts a block diagram of a front steering linkage, according to aspects of the present disclosure.
Figure 6A:
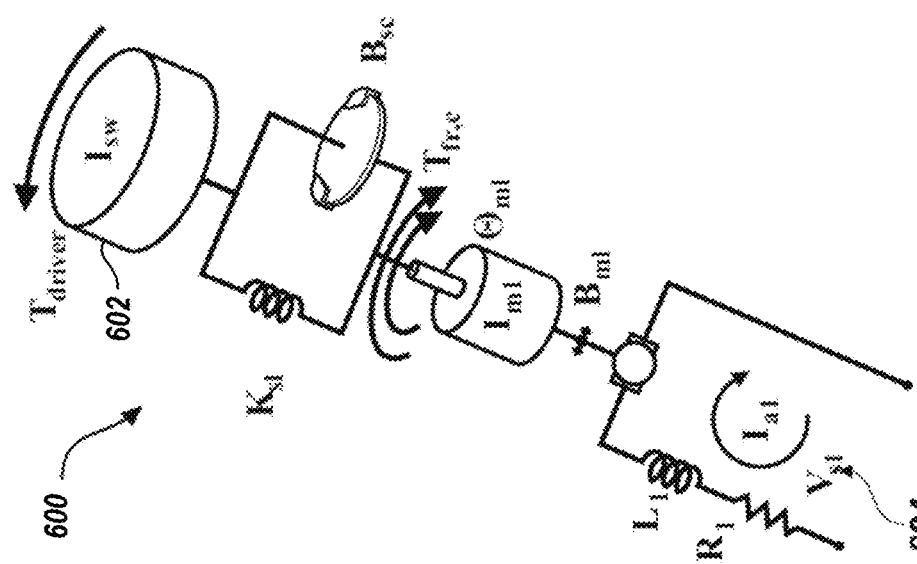
FIG. 6A depicts a block diagram of a steer-by-wire driver interface, according to aspects of the present disclosure.

To complete the linearization, a differential equation can then be derived, which takes as input the steering wheel angle command 102 and output the steering wheel angle measurement 118. The steer-by-wire driver interface 600, of FIG. 6A, depicts the mechanical-to-electrical transition from a steering wheel 602 to an electrical output 604 (e.g., a steering wheel angle command 102). The front steering linkages 601, of FIG. 6B, depict the electrical-to-mechanical transition from an electrical input 603 (e.g., the steering wheel angle command 102) to the road wheels 605a, 605b.

Once the differential equation is derived, it is converted from the time domain to the complex frequency domain using Laplace transforms to determine the transfer function L(s). For example, at block 504, the processing device determines an open-loop transfer function L(s) of the open-loop SbW system 100. A transfer function is a mathematical representation that describes the inputs and outputs of models in the Laplace domain. This is equivalent to differential equations in the time domain.

At block 506, the processing device estimates margins of stability for the open-loop SbW system 100. Estimating the margins of stability can include, for example, calculating one or more of the stability margin ($s_m$), the gain margin ($g_m$), the phase margin ($\varphi_m$), and the delay margin ($\tau_m$) as described herein. According to aspects of the present disclosure, MATLAB functions, such as allmargin or margin_gain can be used to estimate the margins of stability. Once the margins of stability are estimated, the margins of stability can be implemented into a steering system of a vehicle at block 508 to reduce instability in the steering system.

Additional processes also may be included, and it should be understood that the processes depicted in FIG. 5 represent illustrations and that other processes may be added or existing processes may be removed, modified, or rearranged without departing from the scope and spirit of the present disclosure.

Figure 7:
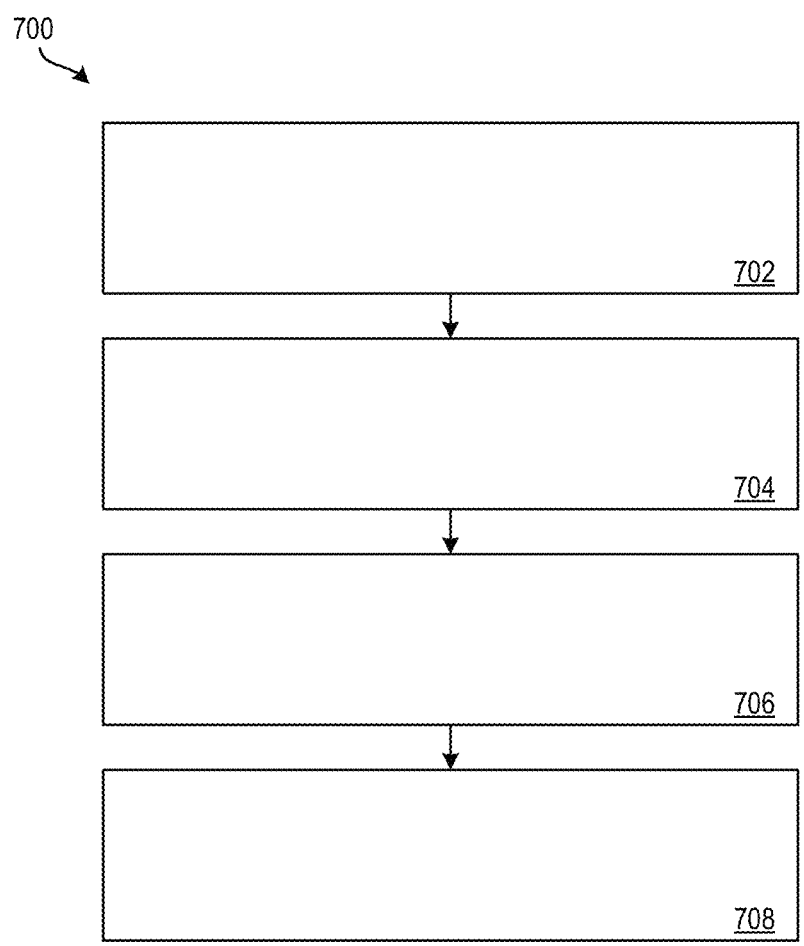
FIG. 7 depicts a flow diagram of a method for open-loop SbW system identification, according to aspects of the present disclosure.

FIG. 7 depicts a flow diagram of a method 700 for open-loop SbW system identification, according to aspects of the present disclosure. The method 700 uses the open-loop SbW system 100 of FIG. 1 to estimate margins of stability. The method 700 can be implemented, for example, by the processing system 1000 of FIG. 10 or by another suitable processing system or device.

At block 702, a processing device (e.g., the processor 1021 of FIG. 10) collects input data and output data from the open-loop SbW system 100. The input data is a steering wheel angle command (e.g., the command 102) from an emulator, and the output data is a steering wheel angle measurement (e.g., the steering wheel angle measurement 118). This enables the margins of stability to be estimated without knowing the details of the open-loop SbW system 100 (e.g., only the input and output data are needed).

Figure 8A:
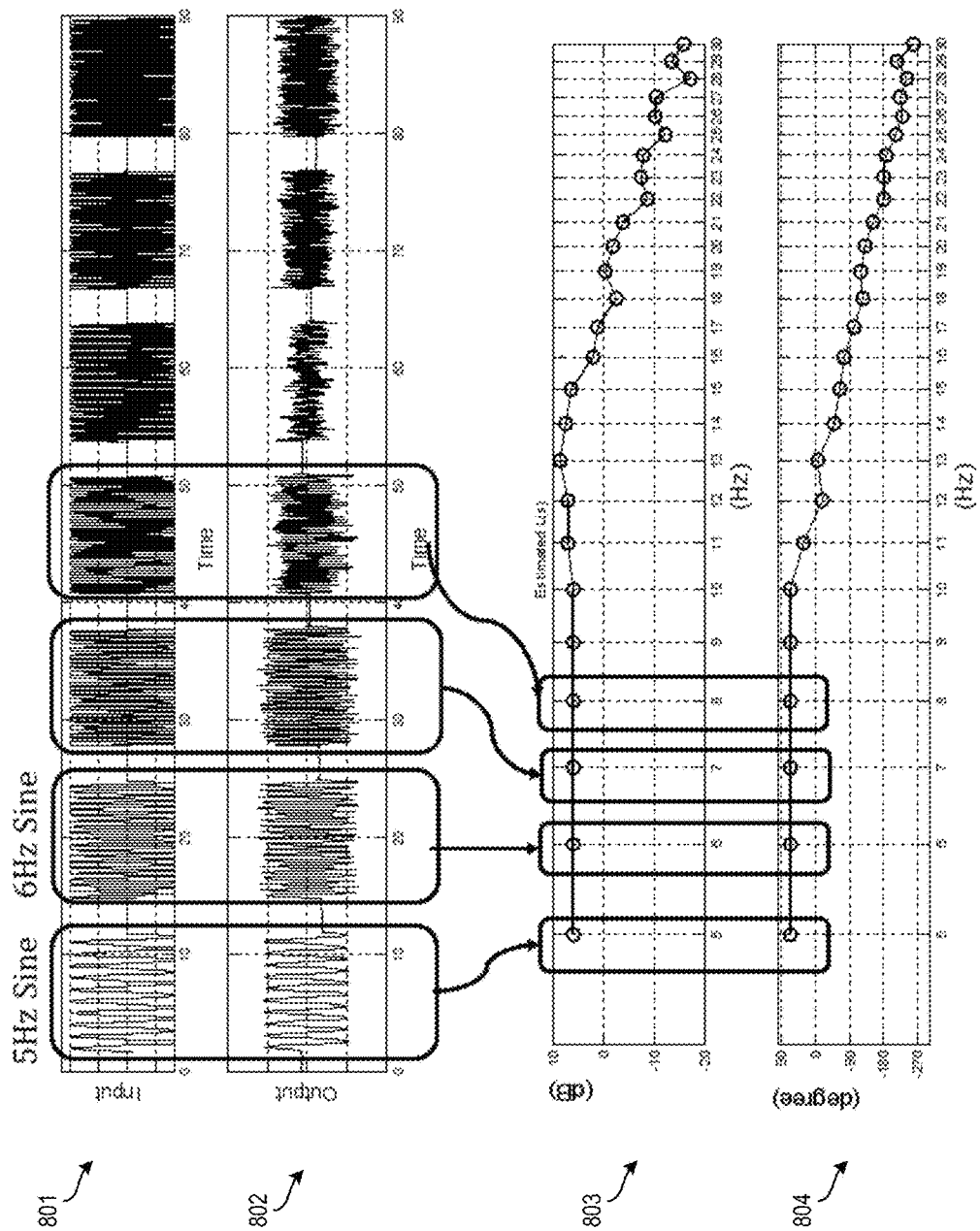
FIG. 8A depicts the plots and Bode plots of the input data and output data, according to aspects of the present disclosure.
Figure 8B:
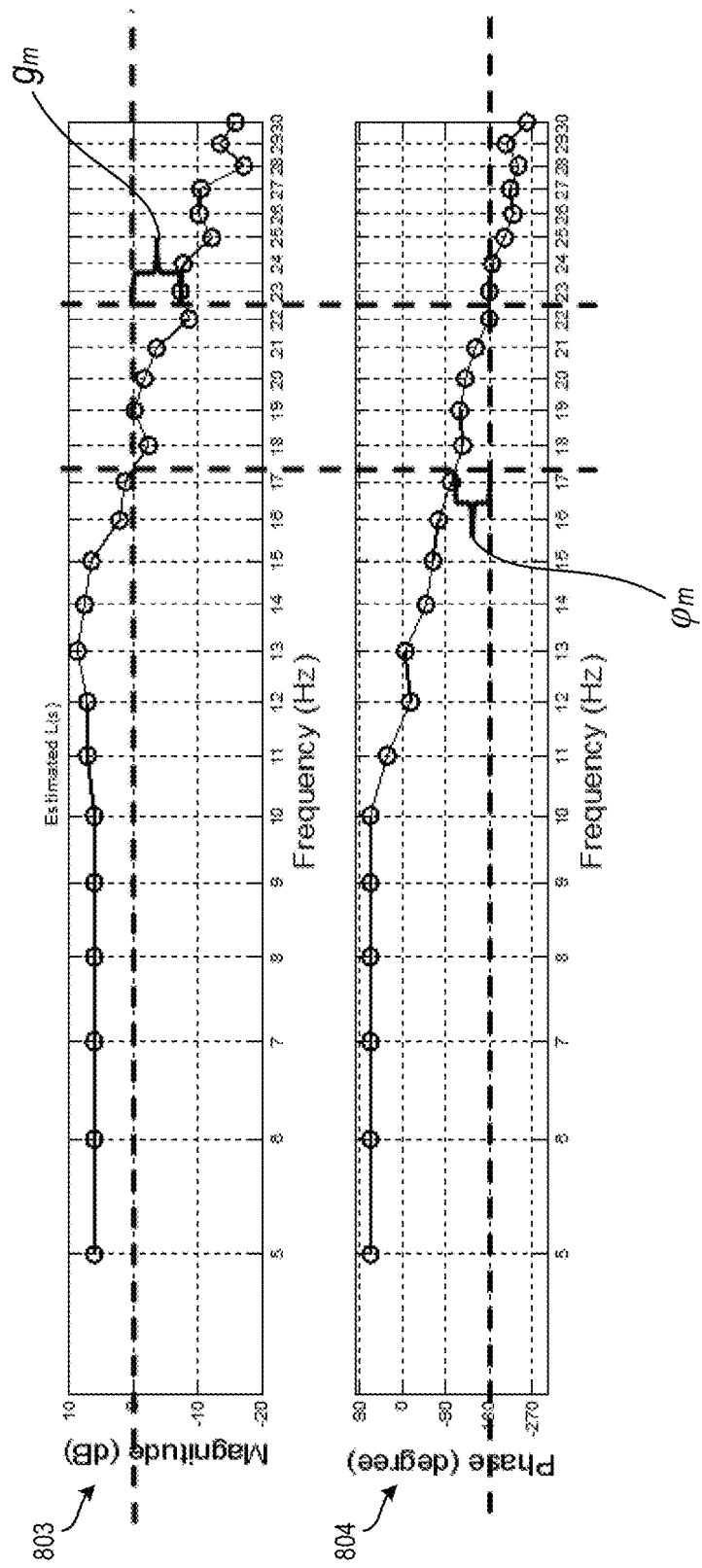
FIG. 8B depicts the Bode plots of the input data and output data, according to aspects of the present disclosure.

At block 704, the processing device determines an open-loop transfer function L(s) based at least in part on the collected input data and the collected output data. For example, the input data and output data can be plotted at different frequencies over time. FIG. 8A depicts the plots 801, 802 of the input data and output data respectively according to aspects of the present disclosure. The input data and output data can be converted to a magnitude Bode plot 803 and a phase Bode plot 804 as shown in FIG. 8B, which can be used to estimate margins of stability. In this example, the open-loop transfer function L(s) is an estimated open-loop transfer function. According to aspects of the present disclosure, the open-loop transfer function L(s) can be estimated using the MATLAB function tfestimate, can be estimated using fast Fourier Transform techniques, or can be estimated using other suitable techniques.

For example, at block 706, the processing device estimates margins of stability for the open-loop SbW system using the open-loop transfer function L(s). A gain margin ($g_m$) can be estimated based on the magnitude Bode plot 803, depicted in FIGS. 8A and 8B. Similarly, a phase margin ($\varphi_m$) can be estimated based on the phase Bode plot 804, depicted in FIGS. 8A and 8B. In some examples, a delay margin ($\tau_m$) can be calculated using the following equation:

$$\tau_m = \frac{\varphi_m}{\text{frequency at which } \varphi_m \text{ is measured}} \times \frac{\pi}{180}$$

Stability margin ($s_m$) can be estimated from the Nyquist plot, which can be obtained from the plots 801, 802 depicted in FIG. 8A.

To reduce the effect of nonlinearities, the open-loop transfer function L(s) can be compared with different amplitudes of input signals and look for coherency signals between input data and output data. Once the margins of stability are estimated, the margins of stability can be implemented into a steering system of a vehicle at block 708 to reduce instability in the steering system.

Additional processes also may be included, and it should be understood that the processes depicted in FIG. 7 represent illustrations and that other processes may be added or existing processes may be removed, modified, or rearranged without departing from the scope and spirit of the present disclosure.

Figure 9:
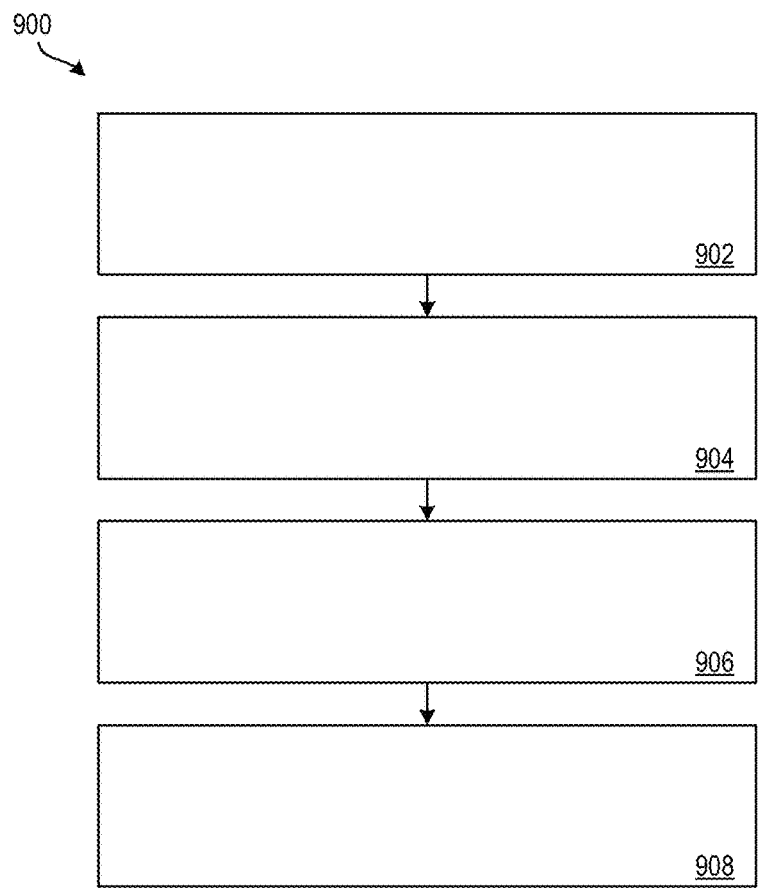
FIG. 9 depicts a flow diagram of a method for closed-loop SbW system identification, according to aspects of the present disclosure.

FIG. 9 depicts a flow diagram of a method 900 for closed-loop steer-by-wire (SbW) system identification, according to aspects of the present disclosure. The method 900 uses the closed-loop SbW system 101 of FIG. 1 to estimate margins of stability without the need for simulations and in-vehicle experiments. The method 900 can be implemented, for example, by the processing system 1000 of FIG. 10 or by another suitable processing system or device. The method 900 introduces a disturbance to the closed-loop SbW system 101 to derive a closed-loop transfer function. This enables the margins of stability to be estimated without knowing details of the SbW system 101 (e.g., only the input and output data are needed). This provides a real-time estimation of margins of stability while all features of the SbW system 101 are running simultaneously in a closed loop.

At block 902, a processing device (e.g., the processor 1021 of FIG. 10) adds a disturbance signal 921 to the closed-loop SbW system 101 of FIG. 1, such as between the torque calculator 112 and the steering emulator controller 116 of FIG. 1B. The disturbance signal (i.e., disturbance torque) 921 can be, for example bandlimited white noise signals, sum of sines or signal sines with different frequencies, etc. (see, e.g., Bode plots 801, 802 of FIG. 8A) The disturbance torque 921 added by the command 114 becomes a new steering wheel torque command 922, which is fed into the steering emulator controller 116. When disturbance torque 921 is zero, signal 922 equals command 114.

At block 904, the processing device determines an open-loop transfer function L(s) based on the disturbance torque (e.g., the disturbance signal 921) and a steering wheel torque command (e.g., the command 114 or the command 922). The transfer functions are derived from the following equations:

$$\frac{\text{Signal 922 }(s)}{\text{Signal 921 }(s)} = \frac{1}{1 + L(s)},$$

$$\frac{\text{Signal 114 }(s)}{\text{Signal 921 }(s)} = \frac{-L(s)}{1 + L(s)^2},$$

where, $$\frac{\text{Signal 922 }(s)}{\text{Signal 921 }(s)}$$

is a transfer function from signal 921 to signal 922, and $$\frac{\text{Signal 114 }(s)}{\text{Signal 921 }(s)}$$

is transfer function from signal 921 to signal 114. These two transfer functions can be estimated using the MATLAB function tfestimate, can be estimated using fast Fourier Transform techniques, or can be estimated using other suitable techniques. Either of these equations can then be solved for L(s) to derive the transfer function.

At block 906, the processing device estimates margins of stability for the closed-loop SbW system 101 using the open-loop transfer function L(s) derived at block 904. In particular, the margins of stability can be estimated/calculated as described herein. Once the margins of stability are estimated, the margins of stability can be implemented into a steering system of a vehicle at block 908 to reduce instability in the steering system.

Additional processes also may be included, and it should be understood that the processes depicted in FIG. 9 represent illustrations and that other processes may be added or existing processes may be removed, modified, or rearranged without departing from the scope and spirit of the present disclosure.

Figure 10:
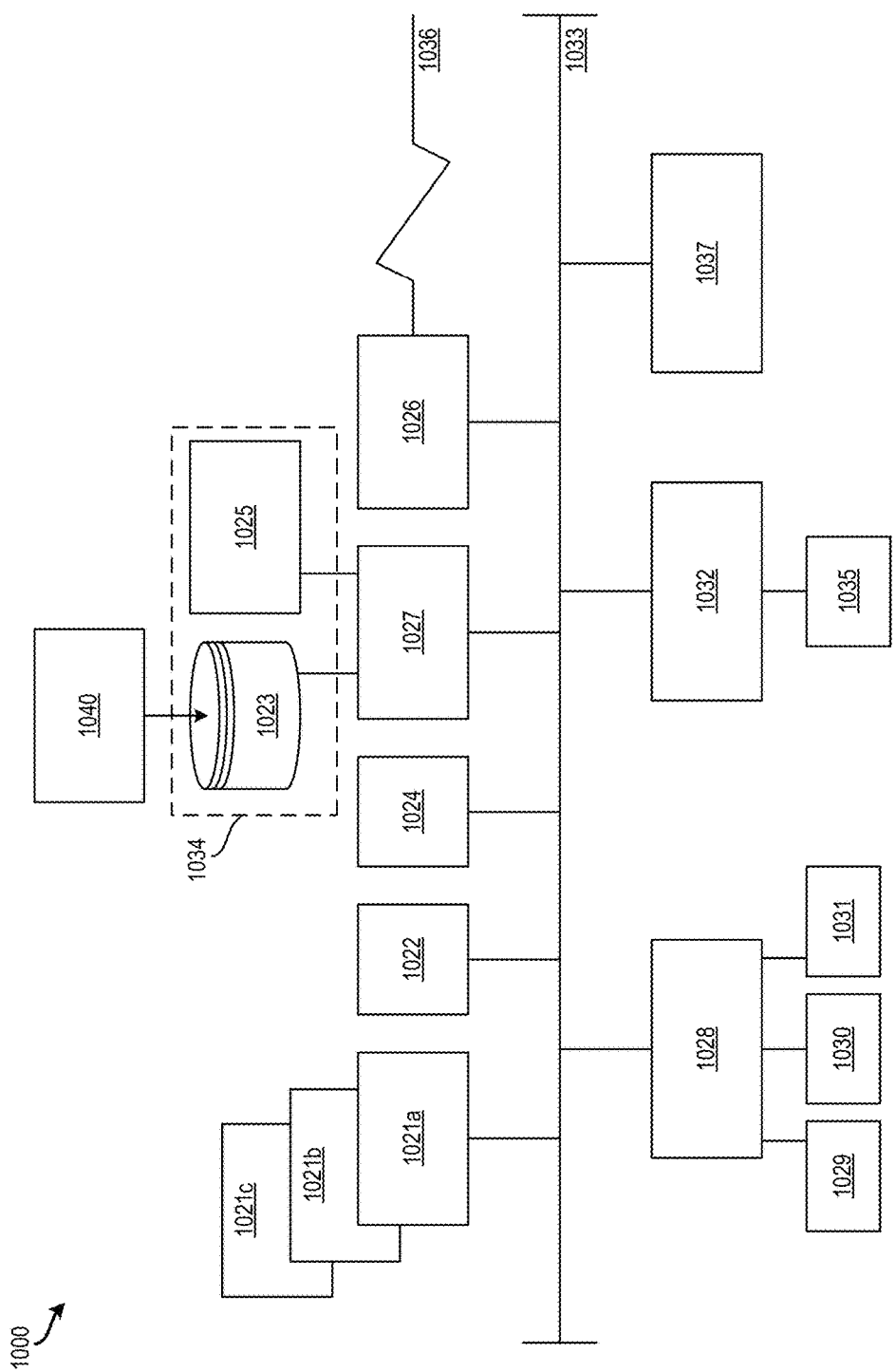
FIG. 10 depicts a block diagram of a processing system for implementing the techniques described herein, according to aspects of the present disclosure.

It is understood that the present disclosure is capable of being implemented in conjunction with any other type of computing environment now known or later developed. For example, FIG. 10 illustrates a block diagram of a processing system 1000 for implementing the techniques described herein. In examples, processing system 1000 has one or more central processing units (processors) 1021*a*, 1021*b*, 1021*c*, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and can include a basic input/output system (BIOS), which controls certain basic functions of processing system 1000.

Further illustrated are an input/output (I/O) adapter 1027 and a network adapter 1026 coupled to system bus 1033. I/O adapter 1027 can be a small computer system interface (SCSI) adapter that communicates with a hard disk 1023 and/or other storage drive 1025 or any other similar component. I/O adapter 1027, hard disk 1023, and storage device 1025 are collectively referred to herein as mass storage 1034. Operating system 1040 for execution on processing system 1000 can be stored in mass storage 1034. A network adapter 1026 interconnects system bus 1033 with an outside network 1036 enabling processing system 1000 to communicate with other such systems.

A display (e.g., a display monitor) 1035 is connected to system bus 1033 by display adaptor 1032, which can include a graphics adapter to improve the performance of graphics and general computation intensive applications and a video controller. In one aspect of the present disclosure, adapters 1026, 1027, and/or 1032 can be connected to one or more I/O buses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 can be interconnected to system bus 1033 via user interface adapter 1028, which can include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store an operating system to coordinate the functions of the various components shown in processing system 1000.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. For example, instead of breaking the connection between the steering wheel angle measurement 118 and the torque calculator 112, the open-loop system 100 can be defined by breaking the connection between the converter 104 and the road wheel actuator controller 108, or between the road wheel actuator 108 and the torque calculator 112, or between the torque calculator 112 and the steering emulator controller 116. The position or torque disturbance can be added to the command 102, the command 106, or the output 110 to enable the closed-loop system identification methods instead of adding the disturbance signal 921 to the command 114. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for open-loop steer-by-wire (SbW) system linearization, the method comprising:
    linearizing, by a processing device, an open-loop SbW system at different operating points;
    determining, by the processing device, an open-loop transfer function of the open-loop SbW system;
    estimating, by the processing device, margins of stability for the open-loop SbW system; and
    implementing the margins of stability into a vehicle to reduce instability in a steering system of the vehicle.

2. The computer-implemented method of claim 1, wherein estimating margins of stability further comprises calculating a stability margin at each of the different operating points.

3. The computer-implemented method of claim 1, wherein estimating margins of stability further comprises calculating a gain margin at each of the different operating points.

4. The computer-implemented method of claim 1, wherein estimating margins of stability further comprises calculating a phase margin at each of the different operating points.

5. The computer-implemented method of claim 1, wherein estimating margins of stability further comprises calculating a time delay margin at each of the different operating points.

6. The computer-implemented method of claim 1, wherein linearizing the open-loop SbW system further comprises:
    defining, by the processing device, the different operating points;
    deriving, by the processing device, linear differential equations of mechanical systems, electrical systems, and control algorithms in the vehicle at the different operating points; and
    deriving, by the processing device, a differential equation that takes as input a steering wheel angle command and outputs a steering wheel angle measurement.

7. The computer-implemented method of claim 6, wherein determining the open-loop transfer function further comprises:
    converting, by the processing device, the differential equation from a time domain to a Laplace domain to obtain the open-loop transfer function.

8. A computer-implemented method for open-loop steer-by-wire (SbW) system identification, the method comprising:

collecting, by a processing device, input data and output data from an open-loop SbW system;

determining, by the processing device, an open-loop transfer function based at least in part on the collected input data and the collected output data;

estimating, by the processing device, margins of stability for the open-loop SbW system using the open-loop transfer function; and implementing the margins of stability into a vehicle to reduce instability in a steering system of the vehicle.

9. The computer-implemented method of claim 8, wherein estimating margins of stability further comprises calculating a stability margin.

10. The computer-implemented method of claim 8, wherein estimating margins of stability further comprises calculating a gain margin.

11. The computer-implemented method of claim 8, wherein estimating margins of stability further comprises calculating a phase margin.

12. The computer-implemented method of claim 8, wherein estimating margins of stability further comprises calculating a time delay margin.

13. The computer-implemented method of claim 8, wherein the margins of stability are determined from Bode plots of the collected input data and the collected output data.

14. The computer-implemented method of claim 8, wherein the input data is a steering wheel angle command from an emulator, and wherein the output data is a steering wheel angle measurement.

15. A computer-implemented method for closed-loop steer-by-wire (SbW) system identification, the method comprising:

adding, by a processing device, a disturbance signal to a closed-loop SbW system;

determining, by the processing device, a closed-loop transfer function based on the disturbance input and a steering wheel torque command;

estimating, by the processing device, margins of stability for the closed-loop SbW system using the closed-loop transfer function; and implementing the margins of stability into a vehicle to reduce instability in a steering system of the vehicle.

16. The computer-implemented method of claim 15, wherein the disturbance signal is disturbance torque.

17. The computer-implemented method of claim 16, wherein the disturbance torque is bandlimited white noise signals.

18. The computer-implemented method of claim 16, wherein the disturbance torque is a sum of sines with different frequencies.

19. The computer-implemented method of claim 16, wherein estimating margins of stability further comprises calculating at least one of a stability margin, a gain margin, a phase margin, and a time delay margin.

* * * * *